United States Patent [19]

Goodfellow

[11] 3,974,989

[45] Aug. 17, 1976

[54] INFLATABLE LIGHTER-THAN-AIR ARTICLE COMPOSED OF A COATED TRIAXIAL WEAVE CONSTRUCTION

[75] Inventor: Kenneth A. Goodfellow, Fairfield, Conn.

[73] Assignee: E. I. Du Pont de Nemours and Company, Wilmington, Del.

[22] Filed: Apr. 10, 1975

[21] Appl. No.: 567,016

[52] U.S. Cl. .............................. 244/126; 428/252; 428/257
[51] Int. Cl.² ........................................... B64B 1/14
[58] Field of Search ................ 244/126; 139/383 R; 428/252, 257

[56] References Cited
UNITED STATES PATENTS

| | | | |
|---|---|---|---|
| 3,127,135 | 3/1964 | Burr et al. | 244/126 |
| 3,446,251 | 5/1969 | Dow | 139/383 R |
| 3,874,422 | 4/1975 | Dow | 139/383 R |

FOREIGN PATENTS OR APPLICATIONS

| | | | |
|---|---|---|---|
| 430,828 | 10/1911 | France | 244/126 |
| 371,604 | 4/1932 | United Kingdom | 244/126 |

*Primary Examiner*—Stephen G. Kunin
*Assistant Examiner*—Barry L. Kelmachter

[57] ABSTRACT

An improved lighter-than-air article is provided. The improvement is a covering which consists essentially of a triaxial fabric having a gas impermeable polymeric film firmly adhered to one surface and a heat-sealable polymeric film firmly adhered to the other surface.

4 Claims, No Drawings

INFLATABLE LIGHTER-THAN-AIR ARTICLE COMPOSED OF A COATED TRIAXIAL WEAVE CONSTRUCTION

BACKGROUND OF THE INVENTION

1. Field of the Invention

This invention relates to an improved inflatable lighter-than-air article, more particularly an improvement in a covering for an inflatable lighter-than-air article.

2. Prior Art

Although inflatable lighter-than-air articles such as balloons, dirigibles, zeppelins, and blimps have been known to man for a long time, they have never achieved their full potential as carriers of either cargo or passengers.

One of the reasons for this is the lack of a covering having sufficient lightness and strength which is capable of being manufactured inexpensively and easily.

Known coverings of inflatable lighter-than-air articles are comprised of biaxial weave fabrics coated with various resins or elastomers such as neoprene or urethane. Coating biaxial fabric is well known in the art. However, such coated fabrics have an inherent weakness of the bias (45° from either the warp or weft yarns) which can lead to insufficient physical properties for inflatable articles. For example, tear and tear propagation resistance are physical properties which generally can be inadequate. At the low coating weights required for airships, these coated fabrics may have good tear but have poor bias strengths. To achieve a balance of these properties it is necessary to laminate multiple plies of fabric oriented at different angles. To laminate in this manner requires a laborious process, part of which can only be done by hand.

Triaxial fabrics are described in U.S. Pat. No. 3,446,251, issued May 27, 1969 to Norris F. Dow. The stated resistance to tear of these fabrics is said to be a property for many end-use applications. However, there does not appear to be much difference in isotropic strength of uncoated triaxial fabrics when compared to uncoated biaxial fabrics of similar construction and weight.

An inflatable lighter-than-air article having the improved covering has reduced weight and increased strength, and allows the carrying of larger and heavier loads; thereby, increasing its safety, economic advantage, and acceptance. This would aid inflatable articles to achieve their full commercial potential.

SUMMARY OF THE INVENTION

This invention is directed to an improvement in inflatable lighter-than-air articles, the improvement being a covering composed of a coated triaxial fabric. The coated triaxial fabric consists of a triaxial fabric, weighing less than 2 ounces per square yard, having firmly adhered to one side a heat sealable polymeric coating and having firmly adhered to the other side a gas impermeable film. The coated fabric has a thickness of 6 to 10 mils, a weight of not more than 8 ounces per square yard, a tensile strength measured at the weakest direction according to ASTM-D-751 of at least 300 lbs. and a tear strength measured by ASTM-D-751 of at least 25 pounds.

DESCRIPTION OF THE INVENTION

The inflatable lighter-than-air article of this invention is comprised of a coated triaxial fabric. The coated triaxial fabric is produced by coating and/or impregnating one surface of a triaxial fabric with a heat sealable polymeric composition using conventional techniques known in the art, and then by adhering a gas impermeable film to the other surface of the fabric using conventional techniques known in the art. Conventional coating techniques include dipping, brushing, spraying and calendering.

The triaxial fabrics used in the invention are described in U.S. Pat. No. 3,446,251, the disclosure of which is hereby incorporated by reference. These fabrics have three angularly displaced sets of parallel courses of yarns, woven so as to prevent slippage of at least one yarn course set along any other yarn course set. By varying the openness of the weave, slippage of all three yarn course sets can be varied or prevented.

The yarns used in the triaxial fabrics can be made of any material commonly used in fiber manufacture such as polyester, polyamide, and aromatic aramide. Fabric weight depends upon the yarn used and weave density. The triaxial fabric utilized weighs less than 2 ounces per square yard.

A preferred triaxial fabric is woven from aromatic aramide fiber because of its high strength per weight.

A gas impermeable film is any film which is impermeable to lighter-than-air gas. Included among the impermeable films are polyvinyl fluoride film, polyethylene terephthlate film, and polyvinylidene chloride. The impermeable film has a thickness of 0.001 to 0.0015 mil and weight of 1.3-2.0 ounces per square yard. The impermeable film will include an ultraviolet light absorber with it. Titanium dioxide is an example of an ultraviolet light absorber.

The gas impermeable film can be pretreated by dipping into a solution of a heat sealable substance prior to being adhered to the fabric. The pretreatment is to increase the strength of adhesion to the fabric and to provide a substance which can seal minute openings formed during manufacture of the inflatable article.

A preferred impermeable film is polyvinyl fluoride film which has been pretreated by dipping into a solution of chemical adhesive, such as, isocyanate, polyester, or epoxy adhesive, and a solution of a heat sealable polyester urethane.

A heat sealable polymeric film is produced by any thermoplastic material capable of increasing the tensile strength of the triaxial fabric and of sealing any minute opening produced during manufacture of the inflatable lighter-than-air article.

Included among the thermoplastic materials are polyether urethane, polyester urethane, polyvinyl chloride, and chlorosulfonated polyethylene.

Preferred thermoplastic materials are polyester urethanes, such as Estanes sold by B. F. Goodrich Chemical Company or Rucothanes sold by the Hooker Chemicals and Plastics Corporation.

EXAMPLE 1

A coated triaxial weave fabric consistng of a Ply "A" and a Ply "B" was prepared as follows.

Prepare Ply "A" as follows:

Calender a 2 mil thick thermoplastic urethane film (Estane 5072 sold by B. F. Goodrich) onto one side of a triaxial aromatic aramide fabric (Kevlar sold by E. I.

du Pont de Nemours and Company) weighing 2.0 ounces/square yard.

Prepare Ply "B" as follows:

Dipcoat a polyvinyl fluoride film containing titanium dioxide (white Tedlar sold by E. I. du Pont de Nemours and Company) into a primer solution of Chemlock 205 (a proprietary primer sold by Hughson Chemical Company) and pass through number 30 wire wound rolls. Dry the primer Tedlar film for two minutes at 120°C.

Dipcoat the primer Tedlar film into a solution of thermoplastic urethane latex (number 1023 Urethane Latex sold by Wyandotte Chemical) and pass through number 30 wire wound rolls.

Laminate Ply "B" to the fabric side of Ply "A" for 2.5 minutes at 135°C. and 1000 pounds per square inch.

The laminate produced weighed less than 8 ounces/square yard and was less than 9 mils thick.

The laminate can be used as the covering for an airship which would have deceased weight and increased strength.

I claim:

1. In an improved lighter-than-air article comprised of lighter-than-air gas and a covering to contain the gas, the improvement consisting of a covering which is a coated triaxial weave fabric consisting essentially of
   a. a triaxial weave fabric
      consisting of fibers wherein said fibers are polyester, polyamide, or aromatic aramide, and
      weighing less than 2 ounces per square yard;
   b. a heat-sealable polymeric film firmly adhered to one side of the triaxial weave fabric,
      said heat-sealable polymeric film being polyether urethane, polyester urethane, polyvinyl chloride, or chlorosulfonated polyethylene; and
   c. a gas-impermeable film firmly adhered to the other side of the triaxial weave fabric,
      said gas-impermeable film being polyvinyl fluoride, polyethylene terephthalate, or polyvinylidene chloride; and
   the coated triaxial weave fabric having
      a thickness of 6 to 10 mils,
      a tensile strength measured at the weakest direction according to ASTM-D-751 of at least 300 pounds, and
      a tear strength measured by ASTM-D-751 of at least 25 pounds.

2. The improved article of claim 1 wherein triaxial weave fabric consists of aromatic aramide fibers.

3. The improved article of claim 1 wherein the gas impermeable film has a thickness of 0.001–0.0015 mil, weight of 1.3–2.0 ounces per square yard, and is further comprised of an ultraviolet absorber.

4. The improved article of claim 3 wherein the gas impermeable film is pretreated with compounds to increase its adhesiveness.

* * * * *